UNITED STATES PATENT OFFICE.

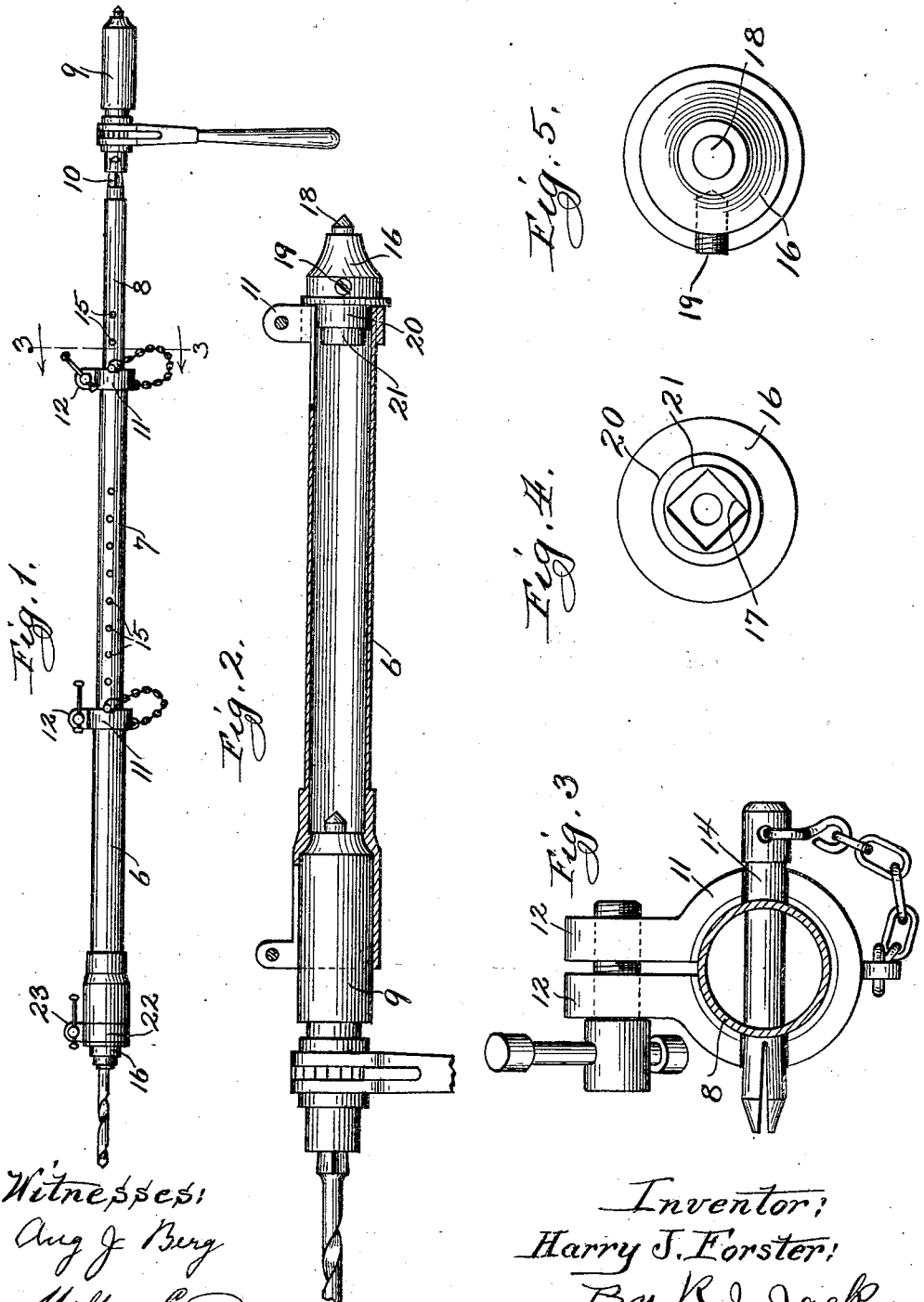

HARRY J. FORSTER, OF CHICAGO, ILLINOIS.

DRILL EXTENSION.

No. 921,644.　　　Specification of Letters Patent.　　　Patented May 11, 1909.

Continuation of application Serial No. 270,286, filed July 18, 1905. This application filed May 6, 1908.
Serial No. 431,263.

*To all whom it may concern:*

Be it known that I, HARRY J. FORSTER, a citizen of the United States, residing at Chicago, in the county of Cook and State of Illinois, have invented a new and useful Drill Extension, of which the following is a specification.

My invention relates to drill extensions which are adjustable in length and interchangeable end for end; and the objects of my improvements are, first, to provide an adjustable blocking or purchase for drills; second, to furnish an adjustable drill extension; third, to provide an end block for the drill extension which serves to make the same interchangeable end for end; fourth, to make a cheap durable and strong construction and other objects to become apparent from the description to follow.

In my former application filed July 18, 1905, Serial No. 270,286, a similar device is shown but the present application refers particularly to a block which is applied to either end of the extension bar.

When drilling holes into metal it is necessary to have a rigid fixed purchase against which the back pressure is exerted when feeding the drill forward, which feeding is done by means of a screw feed. Heretofore this back purchase was formed by blocking up from some fixed wall or abutment to within reach of the ratchet feed, which necessitated the expenditure of considerable time and in many cases was difficult to accomplish. In some instances, especially in connection with boiler repair work it is necessary to drill holes in a portion which is so located that there is no room to swing the ratchet handle any place near where the hole is to be drilled, and to accomplish the drilling of holes in such localities an extra long drill was used; but with the use of my invention any ordinary drill can be extended out the desired distance from the ratchet, and all drilling is accomplished with ease, accuracy and speed.

To describe my invention so that others versed in the art to which it pertains can make and use the same I have illustrated it on the accompanying sheet of drawings forming a part of this specification, in which:

Figure 1, is a side elevation of a device embodying my invention showing it used as a drill extension; Fig. 2 is a similar view partly in section showing the device used as an extension on the ratchet; Fig. 3, is a cross section on line 3—3 of Fig. 1; Figs. 4 and 5 are views of the different ends of the interchangeable block forming a part of my invention.

Similar reference characters refer to similar parts throughout.

The device consists of a plurality of telescoping tubes 6, 7 and 8; the one end tube 6 has its one end enlarged and formed to receive the sleeve 9 of a ratchet feed and the other end tube 8 has its one end provided with the tapering square end 10 which has its extreme end provided with a center point. The tube 7 fits loosely into the tube 6 and the tube 8 fits loosely into the tube 7. The receiving ends of the tubes 6 and 7 are split longitudinally and are provided with means for clamping them tightly to the inner tube; which is preferably done by rigidly fastening a collar 11 around the tube having two extending lugs 12 which are perforated and provided with a headed screw bolt for drawing them together as clearly shown in Fig. 3. The collars 11 when clamped serve to prevent the tubes from sliding one in the other, but to take the force of the end pressure when feeding the drill, I provide the lock pins 14 which are passed through the perforations 15 in tubes 7 and 8 and rest against the ends of tubes 6 and 7 respectively. The ends of said tubes being provided with notches into which the pins 14 fit and thus hold the tubes against rotation one within the other.

As seen in Fig. 1, and shown in detail in Figs. 4 and 5 a removable block 16 is provided which is interchangeable end for end. When it is clamped in the enlarged end of tube 6 as in Fig. 1 the square drill receiving hole 17 is exposed and when it is clamped in the smaller end of tube 6 or in tube 7, the center point 18 is exposed. To prevent the block 16 from turning in the large end of tube 6 the end of the tube has a slot therein and the block 16 is provided with a fixed lug or boss preferably made in the form of a screw 19 which fits into the slot in the tube. It will be seen that the block is provided with the reduced portions 20 and 21 to fit into the small end of tube 6 and in tube 7 respectively.

The main object of this invention is to have it adjustable in length to fit any distance within the range of the shortest tube and all the tubes extended. For this reason the block 16 is provided which as shown in Fig. 2, furnishes the necessary center point when the tube 6 alone is used. Likewise when only tubes 6 and 7 are used the same block 16 again furnishes the center point on the free end of tube 7. When all the tubes 6, 7 and 8 are used the center point provided on the squared end 10 comes into play.

An integral collar 22 having the two extending lugs 23 similar to collars 11 and lugs 12 is provided on the large end of tube 6, and a screw bolt is provided in the lugs 23 for the purpose of clamping the tube about the feed sleeve 9 or the block 16.

Having thus fully described my invention what I claim as new and desire to secure by Letters Patent of the United States is:

In a device of the class described, a bar provided with an interchangeable end piece, and means for clamping said end piece into either of its ends, the one end of said end piece provided with a center pivot and the other end of said end piece provided with a tool socket.

In testimony whereof I have signed my name to this specification in presence of two subscribing witness this 21st day of April 1908, at Chicago, Ill.

HARRY J. FORSTER.

Witnesses:
R. J. JACKER,
MILTON LENOIR.